United States Patent [19]

Takahashi et al.

[11] Patent Number: 4,858,212
[45] Date of Patent: Aug. 15, 1989

[54] RECORDING METHOD ON MAGNETOOPTICAL DISC WITH LASER MAGNETIC FIELD

[75] Inventors: Akira Takahashi, Nara; Yoshiteru Murakami, Nishinomiya; Michinobu Mieda; Tomoyuki Miyake, both of Tenri; Kenji Ohta, Nara, all of Japan

[73] Assignee: Sharp Kabushiki Kaisha, Osaka, Japan

[21] Appl. No.: 222,422

[22] Filed: Jul. 20, 1988

Related U.S. Application Data

[63] Continuation of Ser. No. 927,857, Nov. 6, 1986, abandoned.

[30] Foreign Application Priority Data

Nov. 8, 1985 [JP] Japan .................... 60-251143

[51] Int. Cl.$^4$ .................... G11B 11/12; G11B 13/04
[52] U.S. Cl. .................... 369/13; 360/59; 360/114; 365/122
[58] Field of Search .................... 369/13, 59; 360/114, 360/57, 66, 55, 40; 365/122

[56] References Cited

U.S. PATENT DOCUMENTS

| | | | |
|---|---|---|---|
| 3,474,430 | 10/1969 | Heisseier et al. | 360/131 |
| 4,354,208 | 10/1982 | Maury | 360/40 |
| 4,412,264 | 10/1983 | Imamura et al. | 360/131 |
| 4,446,492 | 5/1984 | Yoshimaru | 360/40 |
| 4,472,748 | 9/1984 | Kato et al. | 360/114 |

FOREIGN PATENT DOCUMENTS

| | | | |
|---|---|---|---|
| 61-198454 | 9/1986 | Japan . | |
| 61-214265 | 9/1986 | Japan | 369/13 |
| 62-01155 | 1/1987 | Japan | 369/13 |

Primary Examiner—Alan Faber
Assistant Examiner—Hoa T. Nguyen
Attorney, Agent, or Firm—Flehr, Hohbach, Test, Albritton & Herbert

[57] ABSTRACT

A magnetooptical disc is initialized by reversing the direction of magnetization at fixed intervals and the direction of external magnetic field applied to it is reversed for each overwrite recording by exposure to laser light.

2 Claims, 1 Drawing Sheet

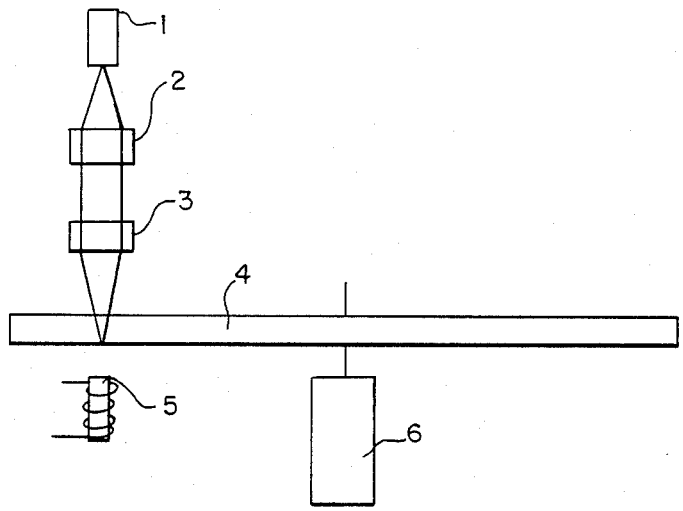
FIG.—1
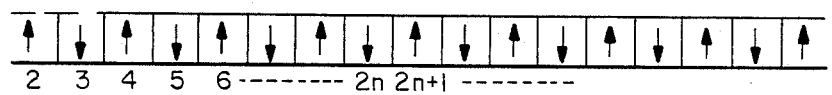
FIG.—2a
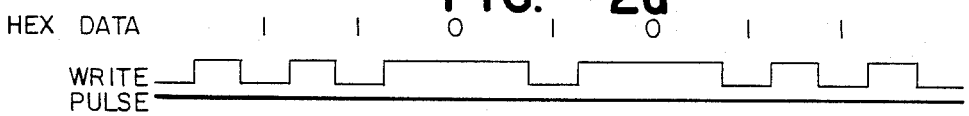
FIG.—2b
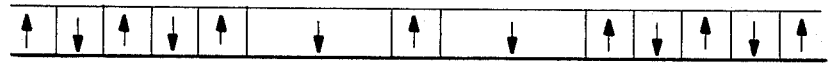
FIG.—2c
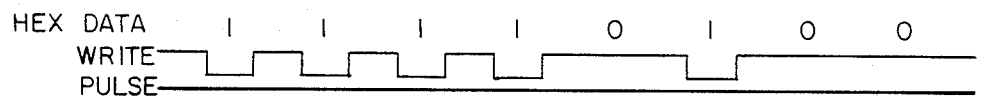
FIG.—2d
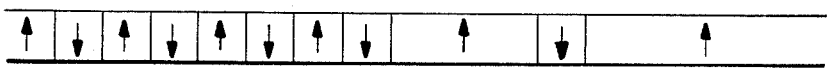
FIG.—2e

RECORDING METHOD ON MAGNETOOPTICAL DISC WITH LASER MAGNETIC FIELD

This is a continuation of application Ser. No. 927,857 filed Nov. 6, 1986, now abandoned.

BACKGROUND OF THE INVENTION

This invention relates to a method of recording on a magnetooptical disc which allows recording, reproduction and erase.

Currently, optical discs of read-only type are nearly in the stage of being practically applicable and those of add-on type are becoming available commercially. All these optical discs have large capacities and non-contact characteristics and they are easy to exchange. Magnetooptical discs have all these advantageous characteristics and have the additional advantage that data can be rewritten easily. Thus, they can be used not only where optical discs could be used before but potentially also where floppy discs and magnetic discs have been employed. When a magnetooptical disc is used as a code data memory, however, it used to be considered a problem that data could not be rewritten (overwrite) as easily as on a floppy disc or a magnetic disc. For this reason, a common practice has been, when it is desired to enter new data where old data already exists, to erase (initialize) the area first and then to write new data. This means that it takes twice as long in time as if use is made of a device with overwrite capability. Although it has been known, as an overwrite method on a magnetooptical disc, to modulate the magnetic write field while keeping the incident laser power constant on the recording medium, the inductance of the coil for generating the magnetic field tends to become too large by this method and since high-speed modulation of the magnetic field is difficult, the speed of data transmission becomes limited.

SUMMARY OF THE INVENTION

It is therefore an object of the present invention to eliminate the aforementioned drawbacks of the conventional method of recording on a magnetooptical disc by providing a new and effective recording method on a magnetooptical disc by which overwrite can be effected even if data require a fast transfer speed.

The above and other objects of the present invention are achieved by initializing a magnetooptical disc by changing direction of magnetization at a fixed spatial interval and reversing the direction fo external magnetic field for each overwrite recording.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIG. 1 is a schematic drawing of a magnetooptical disc device, and

FIG. 2 consisting of a 2a through 2e shows the magnetization conditions of the bits and recording pulses.

DETAILED DESCRIPTION OF THE INVENTION

An example of recording method on a magnetooptical disc embodying the present invention is explained below initially by way of FIG. 1 which shows the structure of a magnetooptical disc device. Numeral 4 therein indicates a magnetooptical disc with a recording medium which includes a thin film of a rare earth-transition metal alloy and numeral 6 indicates a motor which provides rotary motion to the disc 4. Beams emitted from a laser 1 pass through a converging lens 2 and an objective lens 3 and are focused at a designated position on the disc 4 to heat a spot. Numeral 5 indicates a magnet to provide an external magnetic field to the heated spot for causing magnetization reversals. With this magnetooptical disc device, recording is effected, as by the usual method, by maintaining a constant magnetic field while modulating field usually does not change between the time of erasing and the time of writing. According to the method of the present invention, by contrast, the direction of the magnetic field is reversed for each writing.

FIG. 2 shows the conditions of the bits on the magnetooptical disc and the timing of recording pulses. As shown in FIG. 2(a), initialization of the bits according to the present invention means establishing a condition where the direction of magnetization is reversed at fixed spatial intervals. If address numbers are assigned in ascending order sequentially to the bit positions as shown in FIG. 2(a), it may be stated that magnetization is in upward direction at the 2nth (or even-numbered) positions and in the downward direction at the (2n+1)st or odd-numbered positions, n being an integer and the first position appropriately selected. FIG. 2(b) shows the write pulse of data supplied to the laser when it is desired to write "1101011...". At this moment, the laser beams are made incident with the external magnetic field $H_{ex}$ in the downward direction. At the (2n+1)st positions, the write pulse is generated with the laser power on and the desired data is written at the positions in between (that is, at the 2nth positions). Let us assume, for example, that it is desired to write the aforementioned data "1101011..." by using the 4th, 6th, 8th, ... bits. The even-numbered bits are not used for writing this data. According to the method of the present invention, the laser power is on if the data is 0 and the laser power is off if the data is 1. Thus, the laser power is on in this example at the 8th and 12th positions but is off at the 4th, 6th, 10th, 14th, ... positions as shown in FIG. 2(b). Since the coercive force $H_c$ of the recording medium is reduced where temperature is raised by the incident laser beam, the direction of magnetization becomes affected by the aforementioned downward external magnetic field $H_{ex}$, the conditions of the bits become as shown in FIG. 2(c). One can see immediately that FIG. 2(c) represents the desired data written in the return-to-zero format.

The next data to be recorded is written in odd-numbered bits, or the 3rd, 5th, 7th, ... bits while the previously recorded data on the even-numbered bits as explained above are erased by the same laser power. If the next data to be written is "11110100...". a write pulse as shown in FIG. 2(d) may be applied to the disc in the condition of FIG. 2(c) with the direction of the external magnetic field $H_{ex}$ reversed from the previous time of writing and hence pointing upwards. As can be noted readily, the write pulse shown in FIG. 2(d) is on at the 2nth positions for erasing and at those of the (2n+1)st positions corresponding to data 0. It is off at those of the (2n+1)st positions corresponding to data 1. The resultant conditions of the bits are shown in FIG. 2(e) which represents the desired data in the return-to-zero format and the data previously written at 2nth positions is erased. The procedure above can be summarized as follows:

(1) Initializing the disc by reversing the direction of magnetization from one to the next of sequentially numbered positions thereon.

(2) A data is written at even-numbered positions while a downward-pointing external magnetic field is applied.

(3) the next data is written at odd-numbered positions while the data recorded at even-numbered positions is erased and an upward-pointing external magnetic field is applied.

(4) Laser power is applied at positions where recorded data is erased or 0 is to be recorded and not applied at positions where 1 is to be recorded.

The method described above requires that the positions of the bits are accurately detected when write pulses are generated. These positions may be detected, for example, by providing timing marks before the data recording section. Track numbers and sector marks may be utilized as timing marks. These markers may be provided with information regarding the direction of magnetic field at the time of next writing. It is also an effective method to form a bit for timing on the tracks on the disc. Timing may be obtained by reading previous information before writing by using a multi-beam laser. When a multi-beam laser is used, a read beam may be added after a write beam such that the condition of a bit can be checked immediately after information is recorded. In such a case, erase, recording and reproduction can be carried out at once such that data can be processed much faster than by an ordinary magnetic disc when verify is required. In summary, the present invention makes high-speed data overwrite possible even with a magnetooptical disc and hence has the effect of making magnetooptical discs useful in more areas of application.

The foregoing description of a preferred embodiment of the invention has been presented for purposes of illustration and description. It is not intended to be exhaustive or to limit the invention to the precise form disclosed, an many modifications and variations are possible in light of the above teaching. Such modifications and variations which may be apparent to a person skilled in the art are intended to be included within the scope of this invention.

What is claimed is:

1. A method of recording data sequentially on a magnetooptical disc by exposing said disc to laser light and applying an external magnetic field thereto, said disc having sequentially numbered bits, said method comprising the steps of initializing said disc by establishing an initial disc condition wherein the direction of magnetization in said disc is reversed from one to the next of said sequentially numbered bits, reversing the direction of said external magnetic field whenever a new data is recorded on said disc, and using a single laser beam to alternately record a data on odd-numbered ones of said bits while erasing data recorded on even-numbered ones of said bits and to record another data at even-numbered ones of said bits while erasing data recorded on odd-numbered ones of said bits.

2. The method of claim 1 wherein said laser beam is a pulse with power on at those of said sequentially numbered bits where numeral 0 is to be written and off at those of said bits where numeral 1 is to be written.

* * * * *

UNITED STATES PATENT AND TRADEMARK OFFICE
CERTIFICATE OF CORRECTION

PATENT NO. : 4,858,212
DATED : August 15, 1989
INVENTOR(S) : Takahashi et al.

It is certified that error appears in the above-identified patent and that said Letters Patent is hereby corrected as shown below:

Col. 2, line 13,    after the words "while modulating", please add --the laser power. The direction of the magnetic--.

Col. 2, line 28,    "or odd-numbered" should read --(or odd-numbered)--.

Signed and Sealed this

Seventeenth Day of July, 1990

*Attest:*

HARRY F. MANBECK, JR.

*Attesting Officer*     *Commissioner of Patents and Trademarks*